May 25, 1948. M. D. LISTON 2,442,298
MODULATED HEAT RAY DETECTOR
Filed May 29, 1944
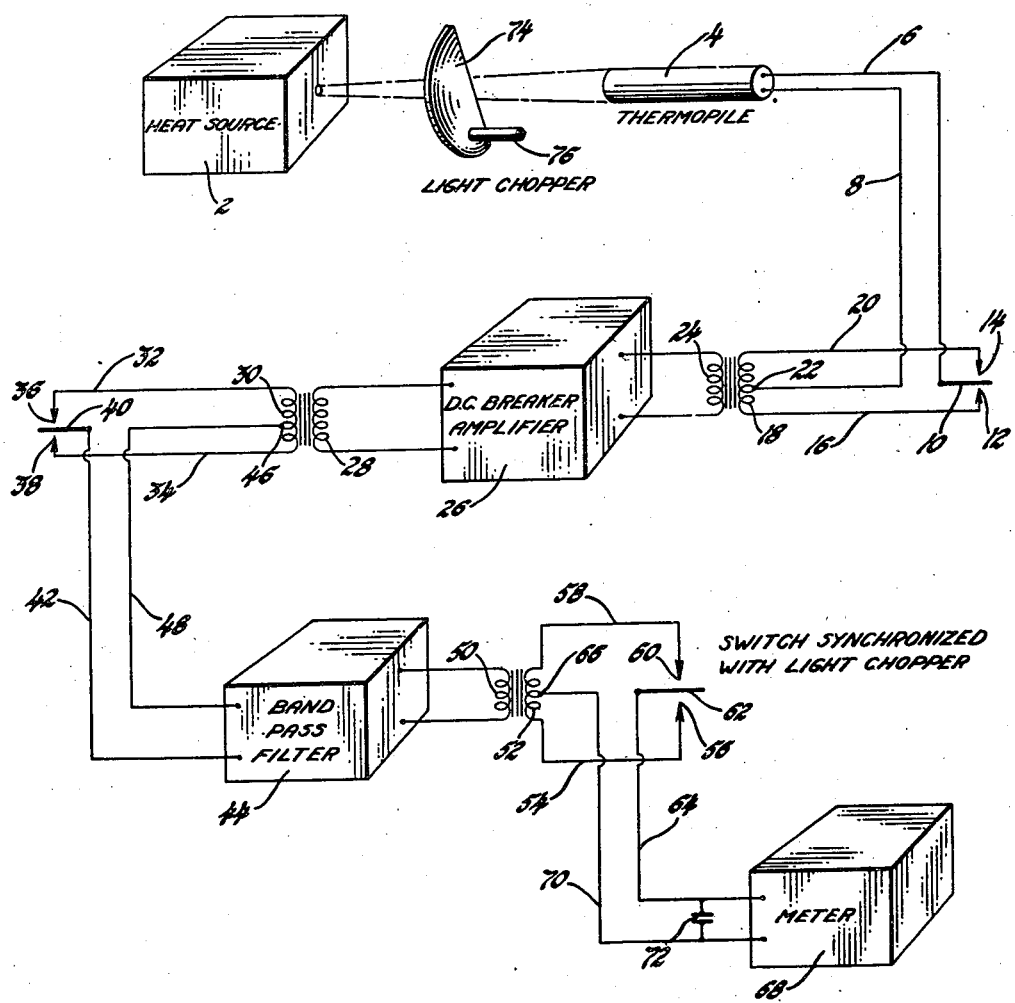
INVENTOR
Max D. Liston
BY
ATTORNEYS Patented May 25, 1948

2,442,298

UNITED STATES PATENT OFFICE 2,442,298

MODULATED HEAT RAY DETECTOR

Max D. Liston, Detroit, Mich., assignor to General Motors Corporation, Detroit, Mich., a corporation of Delaware Application May 29, 1944, Serial No. 537,961

5 Claims. (Cl. 250—83.3)

1

This invention relates to measuring or indicating means and more specifically to means for measuring or indicating radiation in the infrared band of frequencies.

There are, of course, many instances in which it is desirable to measure the existence or quantitative amount of infra-red radiation either from the standpoint of desiring to ascertain the actual amount of said radiation or for use as a detector or locator to ascertain the geographical location or position of the body from which the rays emanate. As an example of this may be cited the heat detector set forth in a copending application Serial No. 442,572, filed May 11, 1942, patented January 7, 1947, as Patent Number 2,413,788, in the names of W. E. Sargeant and H. B. Hoeper, assigned to a common assignee. However, when utilizing a detector for infra-red rays and particularly when the rays are focussed or directed upon a pick-up or sensitive means, stray thermo-potentials may be introduced into the system and make the results obtained inaccurate, if not entirely unusable, inasmuch as the quantities being dealt with are small. If the source from which the heat rays emanate is at a substantial distance, which it would be in the application above referred to, the actual voltage generated by the thermopile is minute. If, at this same time, stray rays from some other source should happen to fall upon the thermopile, more current might be generated than was actually generated by the member being located or measured and an erroneous result would be given.

It is, therefore, an object of my invention to provide means whereby the effect of stray thermo-potentials in a pick-up circuit may be eliminated.

It is a further object of my invention to provide means for chopping or interrupting the incident rays at a definite frequency so that the effect of other unwanted thermo-potentials generated may be filtered out.

It is a still further object of my invention to provide a synchronized switch for rectifying the resultant amplified current which operates in synchronism with the light chopper to provide correct indication.

With these and other objects in view which will become apparent as the specification proceeds, the embodiments of my invention are best understood by reference to the following specification and claims and the illustrations in the accompanying drawing, in which:

The figure is a block circuit diagram illustrating the system of my invention.

Referring now more specifically thereto, there is shown a heat source 2 which may be any source of rays in the infra-red band. Spaced at a distance therefrom is a thermopile 4 which is sensitive to the heat rays and which may be located in some focussing means, not shown, for concentrating the incident rays on the thermopile. The thermopile is connected by lines 6 and 8 to interrupter and amplifying means, the interrupter means comprising a movable arm 10 which oscillates between two fixed contacts 12 and 14, contact 12 being connected through line 16 with one terminal of a transformer primary 18 and the contact 14 through line 20 with the opposite side of said winding. The line 8 from the thermopile is connected to a center tap 22 on winding 18. The secondary 24 of the transformer is connected directly to a vacuum tube amplifier 26 of conventional form.

The output of the amplifier 26 is connected to a primary 28 of a second transformer, the secondary 30 of which is connected through two lines 32 and 34 with spaced contacts 36 and 38 respectively of a second interrupter. The movable interrupter arm or vibrator 40 is connected through line 42 with a band pass filter 44 which is of the low pass type. The center tap 46 of the winding 30 is likewise connected through line 48 with the input of the filter 44. The filter output is connected directly to a third transformer primary 50, the secondary 52 of which is connected through line 54 with stationary spaced contact 56 and through line 58 with a second spaced contact 60. A third vibratory contact 62, cooperating with contacts 56 and 60 is connected through line 64 with an indicating device or meter 68. The center tap 66 of the secondary 52, is likewise connected through line 70 with the meter 68. A condenser 72 is connected across the lines 64 and 70 at the input of the meter.

The basic operation of this type of system is substantially the same as that disclosed in the Sargeant and Hoeper application above referred to, that is, that as the beam of infra-red rays falls upon the thermopile 4, the same will create a very small flow of direct current. Assuming that contact 10 for the moment engages stationary contact 12, it will be obvious that this current will flow through the lower half of transformer primary 18. As soon, however, as this vibrator armature 10 leaves contact 12 and engages contact 14, the lower half of the primary 18 will become deenergized but the upper half will now be energized. Thus as the vibratory member 10 oscillates between the two contacts 12 and 14, opposite halves of the winding 18 will be energized. This induces an alternating current in the secondary winding 24 of the transformer of a frequency dependent upon the speed of movement of the armature 10 back and forth between 12 and 14.

This alternating current is then amplified by a conventional thermionic tube amplifier 26 and the output thereon is applied to the primary 28 and induces in the secondary 30 of this second transformer voltages. However, in this output circuit a similar vibrating or oscillating armature 40 is provided which contacts either stationary contact 36 or 38. This armature is synchronized with armature 10 and contacts its respective stationary contacts at exactly the same time. Thus, though current is induced in the complete secondary winding 30, only one-half of the winding is connected in the output circuit at a time and therefore the current is rectified back to direct current by this method and applied to indicating means or as in this case to the band pass filter. In this manner through the two synchronized breakers and the amplifier small direct currents are amplified to usable ones. The output of the band pass filter would then conventionally be applied to some indicating device or meter.

It will be obvious that if some stray rays come into the thermopile from some other object nearer than the one which is being located or measured, they would entirely upset the operation and give erroneous readings. Likewise, if some error crept into the operation of the thermopile through stray currents, additional erroneous indications would be obtained.

I therefore provide a means for modulating or interrupting the beam of light rays which are then detected and amplified as just described, filtering to remove all but the power of the chopping frequency and at a later point synchronously switching the result of the amplification and filtering to provide an amplified direct current attributable only to the desired infra-red source. That is obtained by rotating a ray chopper or intercepter 74 so that it periodically interrupts the flow of infra-red rays from the source to the thermopile once per revolution. This chopper 74 may be mounted upon any suitable rotating shaft 76. Thus the incoming rays will now have a modulating frequency dependent upon the R. P. M. of the light chopper. This is preferably relatively slow. When, therefore, a pulsating direct current is obtained in lines 42 and 48 after being amplified by the amplifier 26, the band pass filter 44 is so designed as to reduce the amplitude of the components of frequency other than those which have been generated by the light chopper. We then obtain at the transformer 50 a pulsating current whose major modulating frequency depends upon the speed of rotation of the chopper.

In order to reduce this to a direct current which may be read upon the indicating meter, a further rectifying switch is provided synchronized with the light chopper 74. This switch is the oscillating arm 62 which cooperates with the stationary contacts 58 and 60. By this action, therefore, the current is again converted to a direct current and a conventional ammeter will read the amount thereof to provide a direct indication of the strength of the infra-red rays impinging upon the thermopile and at the same time D. C. signals unmodulated or those modulated at some other frequencies are converted into A. C. and cancel out at a direct current indicator; also, A. C. signals of other frequencies passed by the synchronous rectifier likewise cancel out.

It will be obvious that there are two sets of synchronized means, the first set is the chopper 74 and the vibrating armature 62 which provide and rectify the slow undulating pulse which allows other frequencies to be filtered out and the second set comprising vibrator armatures 10 and 40 synchronized together to create a higher frequency solely for the purpose of amplifying the relatively weak currents flowing and which are rectified before the amplified current is applied to the filter.

It will be apparent that I have provided means for undulating an incoming ray to enable filtering out of unwanted thermo-potentials due to other stray effects and synchronized means therewith to convert the resultant current back into direct current.

I claim:

1. In detecting means, a source of rays, sensitive means upon which the rays are directed to create voltage differences, means for periodically interrupting the incident rays interposed between the source and the sensitive means to modulate the voltage of the sensitive means at the frequency of interruption, filtering means connected to the sensitive means to pass the modulating frequency but reduce other frequencies that may have been introduced and rectifying means synchronized with the interrupting means connected to the filter to convert the resultant current to direct current and to pass as A. C. spurious signals from the circuit of the sensitive means.

2. In detecting means, a source of rays, sensitive means upon which the rays are directed to create voltage differences, means for periodically interrupting the incident rays interposed between the source and the sensitive means to modulate the voltage of the sensitive means at the frequency of interruption, filtering means connected to the sensitive means to pass the modulating frequency but reduce other frequencies that may have been introduced, rectifying means synchronized with the interrupting means connected to the filter to convert the resultant current to direct current and to pass as A. C. spurious signals from the circuit of the sensitive means and indicating means connected to the rectifier to indicate the output.

3. In means for detecting the presence of rays in the infra-red portion of the spectrum, a source of rays, thermopile means upon which said rays fall, opaque intercepting means capable of interposition between the source and the thermopile means, means to periodically interpose the opaque means to undulate the output of the thermopile means, filtering means in the output to pass the frequency of interception but reduce other frequencies, rectifying means in the filter output synchronized with the intercepting means to pass as A. C. spurious signals from the thermopile circuit and indicating means connected in turn to the rectifying means.

4. In a detecting apparatus, the combination of a source of radiant energy, a detecting element developing a voltage in response to rays from the source falling thereon, means between the source and element for periodically interrupting the rays, an electronic amplifier connected to the element and amplifying the output therefrom, and a rectifier receiving the output of the amplifier and operating in timed relation to the interrupting means to pass as D. C. the signal introduced by the periodic interruption and to pass as A. C.

spurious signals from the circuit of the detecting element.

5. In a detecting apparatus, the combination of a source of radiant energy, a detecting element developing a voltage in response to rays from the source falling thereon, means between the source and element for periodically interrupting the rays, an electronic amplifier connected to the element and amplifying the output therefrom, and contactor rectifying means receiving the output of the amplifier and operating in timed relation to the interrupting means to pass as D. C. the signal introduced by the periodic interruption and to pass as A. C. spurious signals from the circuit of the detecting element.

MAX D. LISTON.

REFERENCES CITED

The following references are of record in the file of this patent:

UNITED STATES PATENTS

| Number | Name | Date |
| --- | --- | --- |
| 1,475,583 | Hoxie | Nov. 27, 1923 |
| 1,901,400 | Marrison | Mar. 14, 1933 |
| 1,954,204 | Hayes | Apr. 10, 1934 |
| 2,032,588 | Miller | Mar. 3, 1936 |
| 2,114,298 | Gunn | Apr. 19, 1938 |
| 2,133,670 | Schuchmann | Oct. 18, 1938 |

FOREIGN PATENTS

| Number | Country | Date |
| --- | --- | --- |
| 671,864 | Germany | Feb. 17, 1939 |